(12) United States Patent
Wurzburger

(10) Patent No.: US 7,122,269 B1
(45) Date of Patent: Oct. 17, 2006

(54) HYDRONIUM-OXYANION ENERGY CELL

(76) Inventor: Stephen R. Wurzburger, Box C, Goodyear Bar, CA (US) 95944

( * ) Notice: Subject to any disclaimer, the term of this patent is extended or adjusted under 35 U.S.C. 154(b) by 0 days.

(21) Appl. No.: 10/117,877

(22) Filed: May 30, 2002

(51) Int. Cl.
*H01M 8/08* (2006.01)
(52) U.S. Cl. .......................................... 429/46; 429/12
(58) Field of Classification Search ........ 204/263–266, 204/275.1–278; 429/12, 46
See application file for complete search history.

(56) References Cited

U.S. PATENT DOCUMENTS

| | | | | |
|---|---|---|---|---|
| 1,398,658 | A | * | 11/1921 | Vincent ...................... 205/633 |
| 4,628,010 | A | * | 12/1986 | Iwanciow .................... 429/19 |
| 5,159,900 | A | * | 11/1992 | Dammann ..................... 123/3 |
| 5,211,828 | A | * | 5/1993 | Shkarvand-Moghaddam .... 204/266 |
| 5,231,954 | A | * | 8/1993 | Stowe ........................... 123/3 |
| 5,632,870 | A | * | 5/1997 | Kucherov ................... 204/241 |
| 5,830,838 | A | * | 11/1998 | Wurzburger et al. ........ 510/254 |
| 5,891,320 | A | * | 4/1999 | Wurzburger et al. ........ 205/508 |
| 6,475,653 | B1 | * | 11/2002 | Gomez ......................... 429/15 |
| 6,723,226 | B1 | * | 4/2004 | Takayasu et al. ............ 205/746 |
| 2002/0058174 | A1 | * | 5/2002 | Gomez ......................... 429/31 |

OTHER PUBLICATIONS

Hayashi, "Microwater", pub. by Water Institute, no date available.*

* cited by examiner

*Primary Examiner*—Roy King
*Assistant Examiner*—Harry D. Wilkins, III
(74) *Attorney, Agent, or Firm*—Robert Samuel Smith

(57) ABSTRACT

An energy cell for producing electrical energy and a fuel being a mixture of hydrogen and oxygen from aqueous solutions of hydronium and oxyanions. The aqueous solution of hydronium ions is delivered to a cathode in a cathode compartment where the ions are reduced by contact with a precious metal cathode. The aqueous solution of oxyanions is delivered to an anode in an anode compartment where the ions are reduced by contact with a precious metal cathode. Electrical potential between anode and cathode is available as a source of electrical energy. Hydrogen from the cathode department and oxygen from the anode compartment are combusted to provide heat in a combustion compartment.

6 Claims, 1 Drawing Sheet

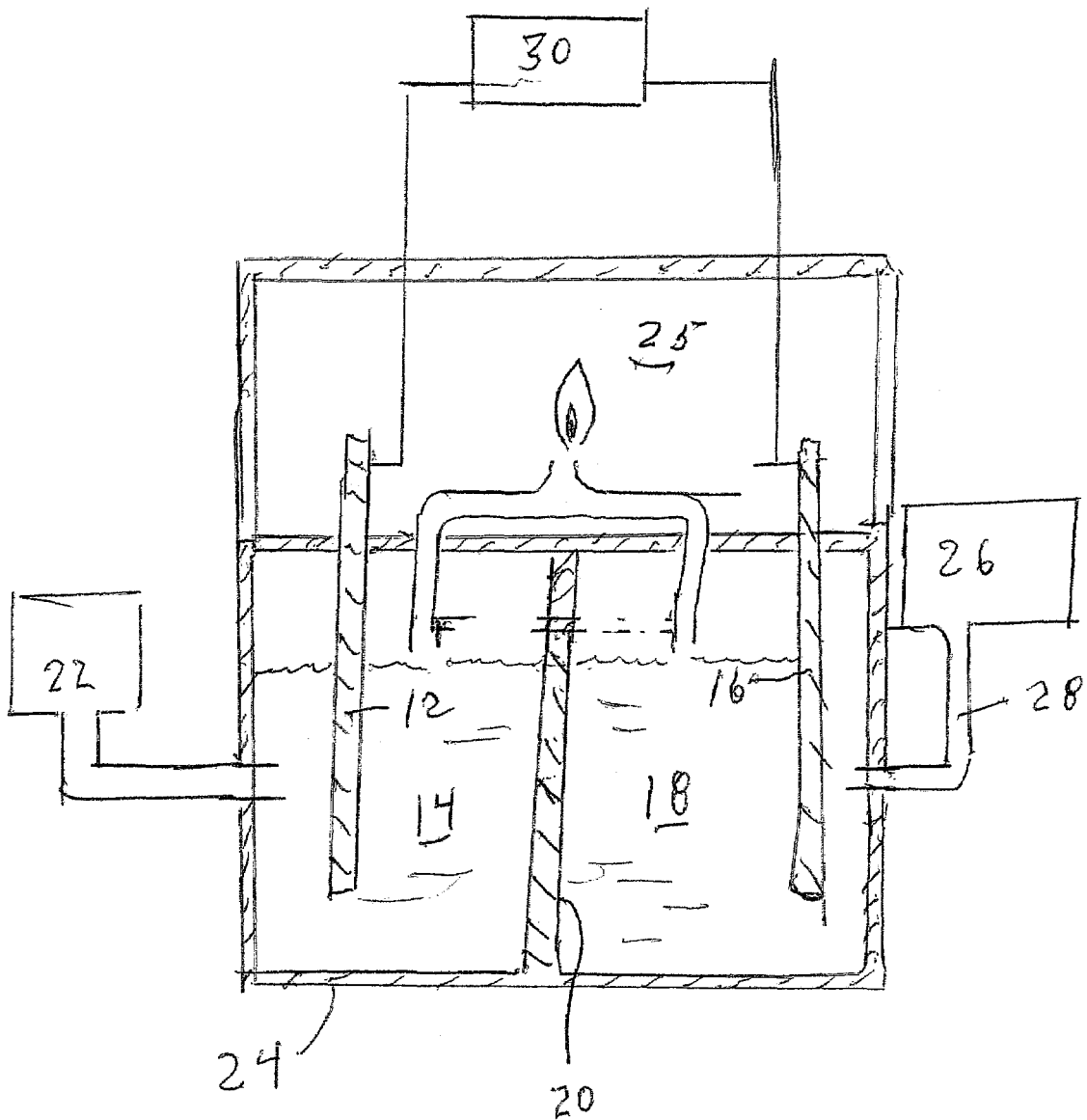

HYDRONIUM-OXYANION ENERGY CELL

FIELD OF THE INVENTION

This invention relates to energy cells and particularly to an energy cell that suported by reduction of a large concentration of hydronium (activated hydrogen) ions and oxidation of a large concentration of oxyanions.

BACKGROUND AND INFORMATION DISCLOSURE

A fuel cell is a type of voltaic cell that converts the chemical energy of a fuel directly to electrical energy.

Fuel cells have been constructed any one of several types.

One type utilizes hydrogen gas or hydrocarbon fuels. This type is characterized as providing a large energy density, has a comparatively small weight and volume of the total system. This type produces a large amount of energy. When this type of cell is used to supply power in a remote area, providing a source of hydrogen is a problem. Compressed gases require large volumes for the actual hydrogen fuel content. Liquid hydrocarbons are more compact than the gas but the actual gram-atoms of hydrogen is small compared to the total gram-atoms of hydrocarbon. The hydrocarbons are also subject to freezing in the surface environment. The hydronium oil doesn't freeze at −12° C. and remains in liquid form. This is the most concentrated form of excess protons that can be produced. If a fuel cell were invented that could utilize all of the three hydrogen atoms in $H_3O$, the solution would contain up to 60 moles of hydrogen per liter of concentrated solution.

U.S. Pat. No. 4,926,456 discloses a process and apparatus for the production of hydrogen rich gas which employs a plurality of double pipe heat exchangers for primary and reforming in a combined primary and secondary reforming process. The primary reforming zone comprises at least one double pipe heat exchanger-reactor and the primary reforming catalyst is positioned either in the central core or in the annulus thereof. The invention is further characterized in that the secondary reformer effluent is passed through whichever of the central core or the annulus is not containing the primary reforming catalyst counter—currently to the hydrocarbon—containing gas stream.

U.S. Pat. No. 5,181,937 discloses a system for steam reforming of hydrocarbons into a rich gas which comprises a connective reformer device. The convective reformer device comprises an outer shell enclosure for conveying a heating fluid uniformly to and from a core assembly within the outer shell. The core assembly consists of a multiplicity of tubular conduits containing a solid catalyst for contacting a feed mixture open to the path of the feed mixture flow such that the path of the path mixture flow is separated from the heating fluid flow in the outer shell. In the process, an auto-thermal reformer fully reforms the partially reformed (primary reformer) effluent from the core assembly and supplies heat to the core assembly by passing the fully reformed effluent through the outer shell of the connective reforming device.

U.S. Pat. No. 5,595,833 discloses a process and apparatus for operating a solid oxide fuel cell stack and includes an adiabatic pre-former to convert about 5–20% of the hydrocarbon fuel into methane, hydrogen and oxides of carbon. At start-up, the refromer is used to perform partial oxidation with methanol to heat the solid oxide fuel stack to a temperature of about 1000° C. When the temperature of the region of the pre-former reaches about 500° C., the methanol flow is terminated.

WO 97/45887 discloses a hydrodesulfurizer assembly which is thermally coupled with process gas heat exchangers and a shift converter. The hydrodesulfurizer assembly is employed to cool the reformer effluent prior to passing the cooled reformer effluent to the shift converter zone.

WO 97/13294 discloses a process for removing carbon monoxide from a gas stream by subjecting the gas stream to a first state high temperature selective catalytic methanation to lower the carbon monoxide concentration followed by a second stage low temperature Selective catalytic methanation to further lower the residual carbon monoxide concentration if the gas stream to a carbon monoxide concentration below 40 ppm.

U.S. Pat. No. 4,94,493 discloses a fuel cell power plant which intergates the operation of a reformer to convert a hydrocarbon fuel into a hydrogen-rich fuel, which is passed to the anode side of a fuel cell. A portion of the anode exhaust stream is withdrawn from the fuel cell and passed to a burner zone wherein the anode exhaust gas stream is mixed with an oxidant stream and combusted to provide heat to the reformer.

U.S. Pat. No. 4,943,493 discloses the problem of monitoring and controlling the flame temperature in the burner zone and claims an indirect approach to maintaining the flame temperature within a range which results in copulate combustion of the fuel and avoids a high flame temperature which may exceed the upper limit of thermal resistance of the burner liner materials. The reference discloses the control of the composition of the anode waste gas to maintain an adiabatic flame temperature between 1150° C. (2100° F.) and about 1480° C. (2700° F. whereby the heat transfer to the reforming zone occurs in the radiant region to provide a high efficiency steam reforming operation.

U.S. Pat. No. 4,861,348 discloses a fuel reforming apparatus wherein the heat for the reforming zone is provided by a combuster. Flames formed within the combustion zone generate a high temperature combustion gas. The apparatus includes a heat insulating layer for preventing radiation heat losses from the combustion gas, and a gas passage disposed around the reforming zone to permit composition gas to flow therethrough. A hydro/carbon/steam mixture is preheated by flowing on the outside of the combustion gas passage in a supply passage before the mixture is passed to the reforming zone.

Heat insulation is provided as an outer layer disposed around the outer peripheral surface of the supply passage to prevent loss of radiation from the inner wall. In one embodiment, forming the catalyst is disposed on the outside of the combustion gas passage in the supply passage to extend the reforming zone. U.S. Pat. No. 4,863,712 discloses a steam reforming process wherein a hydrocarbon feedstock, such as methane, natural gas, LPG or naphtha is reacted with ste3amand or carbon dioxide in the presence of a supported catalyst such as nickel or cobalt. The heat required for the endothermic reaction is supplied from the sensible heat of the reactants or from an external heat source. The reformer is maintained in the range of 700–900° C. or higher.

U.S. Pat. No. 4,869,894 discloses a process for the production and recovery of high purity hydrogen. The process comprises reacting a methane-rich gas mixture in a primary reforming zone at a low steam-to-methane molar ratio of up to 2.5 to produce a primary reformate in a secondary reforming zone with oxygen to produce a secondary reformate, comprising hydrogen and oxides of carbon. The secondary reformate is subjected to a high temperature water gas shift reaction to reduce the amount of carbon monoxide in the hydrogen rich product. The hydrogen rich product is cooled and processed in a vacuum swing absorption zone to remove carbon dioxide and to produce a high purity hydrogen stream.

WO 98/08771 discloses an apparatus and method for converting feed streams such as hydrocarbon fuel of an alcohol into hydrogen and carbon dioxide. The process comprises passing the feed stream first to a partial oxidation reaction zone to produce a partial oxidation effluent. The partial oxidation effluent is passed to a separate steam reforming reaction zone. The partial oxidation reaction one and the steam reforming reaction zone are disposed in a first vessel. A helical tube is extended about the first vessel and a second vessel is annularly disposed about the first vessel such that the helical tube is disposed between thee first and seconds vessels. The third vessel is annually disposed around the second vessel. Oxygen is preheated in the helical tube by heat from the partial oxidation reaction prior to being passed to the partial oxidation zone. The reformant from the steam reforming reaction zone is passed between the first and second vessel and is subjected to a high temperature shift reaction to reduce the carbon monoxide content of the reformant stream. The treated reformant stream is desulfurized, cooled and subjected to a low temperature shift reaction.

U.S. Pat. No. 5,741,474 discloses a process for producing high purity hydrogen by reforming a hydrocarbon and/or oxygen atom containing hydrocarbon to form a reformed gas containing hydrogen and passing the reformed gas through a hydrogen-separating membrane to selectively recover hydrogen. The process comprises the steps of heating a reforming chamber, feeding the hydrocarbon along with the air and or steam to the chamber and then causing both steam reforming and partial oxidation to take place to produced a reformed gas. The reformed gas is passed through a separating membrane to recover a high purity hydrogen stream and the non-permeate stream is combusted to provide heat to the reforming chamber.

U.S. Pat. No. 5,858,314 discloses a natural gas reformer comprising stack of catalyst plates supporting reforming structure wherein the conductive plates transfer heat energy in-plane, across the surface of the conductive plate to support the reforming process.

Conventional steam reforming plants are able to achieve high efficiency through process integration, that is by recovering heat from process streams which require cooling. In the conventional large scale plant, this occurs in large heat exchangers with high thermal efficiency and complex control schemes. In the present invention for the production of hydrogen for fuel cells, it is desired to reach a high degree of process integration with minimal equipment inp order to reduce the size of the plants and the complexity of the control scheme.

U.S. Pat. No. 5,861,441 discloses a process that is representative of such an integrated processing scheme for large plants with integrated compression and heat exchange. It is an object of the invention to provide a compact apparatus for generating hydrogen from available fuels such as such as natural gas, hydrocarbons and alcohols and alcohols for use in a fuel cell to generate electric power. One of the problems faced developers of hydrogen generators working with fuel cells for domestic and transportation use is the high cost of exotic material of construction which are required to withstand the high temperatures of the partial oxidation and reforming processes. It is an objective of the present invention to provide a hydrogen generator of converting natural gas to hydrogen which can be operated without exceeding a process temperature of 700° C. in the heat exchange equipment and thus can be constructed of conventional materials.

Fuel cells are chemical power sources in which electrical power is generated in a chemical reaction. The most common fuel cell is based on the chemical reaction between a reducing agent such as hydrogen and an oxidizing agent such as oxygen. The consumption of these agents is proportional to the power load. Polymers with high proton conductivities are useful as proton exchange membranes (PEM) in fuel cells. Among the earliest PEM's were sulfonated crosslinked polystyrenes. More recently, sulfonated fluorocarbones have been examined. Such PEM's are described in "New Hydrocarbon Proton Exchange Membranes Based on Sulfonated Styrene-Ethylene/Butylene-Styrene Triblock Copolymers" by G. E. Wnek, J. N>Rider, J. N. Serpico, A. Einset, E. G. Ehrenberk and L Raboin presented to the Electrochemical Society Proceedings (1995) Vol. 95–23, pp. 247–251.

U.S. Pat. No. 5,830,838 shows a process for the creation of aqueous solution (referred to herein as ARS containing a high concentration of hydronium ions for metal cleaning purposes. The process disclosed for creating this solution creates a solution having a hydronium ion content that is limited to 1.5 to 2.0 moles. A 2.0 mole solution of ARS has sufficient strength to clean metals but not the concentration of hydronium ions sufficient for use as a proton source for fuel cells.

U.S. Pat. No. 5,830,838 discloses a method for generating a solution that has a hydronium concentration of 1.49 mole per liter, a residual sulfate level of 79,000 to 82,000 ppm, a residual level of Ca of 600 ppm and a residual level of potassium of 200 ppm. These concentrations are acceptble for a metal cleaning solution but are unacceptably high for fuel cells.

SUMMARY OF THE INVENTION

It is an object of the present invention to solve problems associated with small scale systems that rely on producing hydrogen for fuel cells.

It is a further object to provide a simplified method for controlled generation of hydrogen for a fuel cell.

It is still another object to provide a hydrogen based fuel cell with a large electrode potential by virtue of a high concentration of hydronium ions and oxyanions.

Although we do not wish to be bound by theory, it is believed that the following comments provide a guide to estimating the energy generated by the invention.

This invention is directed toward an energy cell in which energy is derived from two sources. One source is the electrical energy derived from the electrode potentials between reduction of hydronium ions at a cathode to produce hydrogen and oxidation of oxyanions at the anode to produce oxygen. The second source is the heat of combustion generated by the hydrogen-oxygen combustion.

Reduction of cations, C+, occurs at the cathode according to:

$$2H_3O^+ + 2e^- \longrightarrow 2H_2O + H_2 \qquad (E_C)$$

and oxidation of oxyanions, $AO^-$ occurring at the anode according to:

$$2OA^- \longrightarrow 2e^- + 2A + O_2 \qquad (E_A)$$

C and A each migrate to a junction where $H_2$ is oxidized by $O_2$ according to:

$$2H_2 + O_2 \text{------} 2H_2O \tag{H}$$

$E_C$ is the positive oxidation potential and $E_A$ is the negative reduction potential so that the cell potential is $E_A - E_C$. H is the free heat of the reaction producing the compound CA.

According to the law of mass action and the Nernst expression for free energy, $E_A$ and $E_C$ depend on the concentrations of the anions and cations, respectively in accordance with:

$$E_A = RT/FE + \log K_A$$

$$E_C = RT/FE - \log K_C$$

(R, F, E are well known constants and T is the temperature of the solution.)

$K_A$ and $K_C$ are the equilbrium constants of the anode and cathode reactions respectively and are proportional to the concentrations of the hydronium ions ($C^+$) at the cathode and the oxyanions ($A-$)

The cell potential (between cathode and anode) is

Since, $\log K_A + \log K_c = \log K_A K_C$

Therefore, $E_A \text{--------} \log (K_A K_C)$ $K_A$ and $K_C$ are proportional to the concentraions of the cations and anions respectively. Therefore, a ten-fold increase in cation and anion concentrations will increase the cell voltage by a factor of four.

In the preferred operation of this invention, the cations are hydronium ions and the anions are oxyanions. The product of combustion is water.

The cell voltage is supported by a continuous supply of hydronium ions to the cathode and oxyanions to the anode.

The neutralized cations are hydrogen molecules. The neutralized anions are oxygen molecules. Hydrogen gas from the cathode escapes to a chamber above the electrodes where it is oxidized by oxygen gas escaping from the anode.

Polarization at the electrodes (the plague of state of the art fuel cells) is avoided by adjusting the relative concentrations of the cations and oxyanions.

Electrical current flows through an external circuit from the cathode to the anode.

The cell voltage is supported by a continuous supply of hydronium ions at the cathode and oxyanions at the anode.

Preferably, the continuous supply of anions is provided using the technique disclosed in U.S. Pat. No. 5,830,838. The supply of oxyanions is provided using the technique disclosed in U.S. Pat. No. 5,891,320. Concentration of ions in both solutions is enhanced by freezing techniques disclosed in copending application 10/117,878. All three of these references are incorporated into this disclosure by reference.

The foregoing summary has highlighted features, aspects and advantages of the present invention. The invention is further explained by the following description of what I presently believe to be the best mode for carrying out the invention illustrated by drawings to which are appended claims which define the scope of the invention.

BRIEF DESCRIPTION OF THE DRAWINGS

The FIGURE shows the construction of the energy cell of this invention.

DESCRIPTION OF A BEST MODE

Turning now to a description of the FIGURE, there is shown a cell including a cell cathode 12 in cathode compartment 14 and a cell anode 16 in anode compartment 18.

The cell cathode and cell anode are preferably precious platinumized gauze which provide a large surface area that is nonreactive. Alternative materials constituting the gauxe include titanium, activated carbon, nickel, stainless steel and other precious metals.

The two compartments are separated by a wall 20. The wall is electrically conducting to provide a common ground to the reaction at the cathode and anode. Each compartment communicates with a combustion chamber above the compartments. Therefore, hydrogen liberated at the cathode and oxygen liberated at the anode combine in mixing tube 21 escape into combustion chamber 25 where combustion of the gases producing water occurs. The combustion chamber is supplied with a pressurized inert atmosphere, prefereably helium that balances pressure in the chamber with atmospheric pressure yet admits the appropriate mixture of hydrogen (from the anode) and oxygen (from the cathode) to support combustion. Any water that is formed by oxidation of hydrogen in the combustion chamber falls back into the electrolyte.

An aqueous solution of hydronium ions is delivered from the hydronium reservoir 22 into the cathode compartment 14 adjacent the cathode 14 through conduit 24. An aqueous solution of oxyanions is delivered from oxyanion reservoir 26 into the anode compartment 18 through conduit 28.

Anode 16 is electrically connected to cathode 12 through electrical impedance 30 resulting in a cell potential across the impedance 30. Impedance 30 is any electrical device capable of being energized by direct current to perform useful work.

As described in more detail and with examples in U.S. Pat. No. 5,830,838, a solution of hydronium ions is produced by adding calcium as an oxde, hydrate, or hydride to a solution of sulfuric acid, n moles of Ca per n moles of sulfuric acid and removing the calcium sufate precipitate under conditions which leave the solution of hydronium ions.

U.S. Pat. No. 5,891,320 discloses a method of producing a solution of oxyanions having a pH of about 13.7 and 54 ppm Ca and less than 500 ppm sulfate ion.

Copending application 10/117878 (incorporated herein by reference) discloses a method for increasing the concentration of ions in an aqueous solution involving:

1./ reduction of the solution to a temperature just below freezing temperature followed by gentle agitation to form a partial ice "slush";

2./ filtering the ice out of the solution leaving an ion rich filtrate.

3./ further enriching the filtate when required by low temperature low pressure distillation.

An example is presented where a concentration of 19 moles per liter of hydronium ions is generated.

There has been described a fuel cell operated with hydronium ions supporting a reduction reaction at the cathode and oxyanions supporting an oxidation reaction at the anode. The oxidation-reduction reaction generates a redox potential being a source of electrical energy and hydrogen and oxygen gases for generating heat of combustion in a combustion engine. In the context of this specification, "combustion engine" is understood to mean any device that relies on the combustion of fuel to perform work. This includes steam engines (external combustion engines), internal combustion engines and turbines.

Variations of the examples presented may be contemplated by reading the specification and studying the drawings, which are within the scope of the invention.

For example, an alternative method for producing hydronium and oxyanionic solutions is disclosed in a report, "Microwater" by H. Hayashi, director, published by the Water Institute, Tokyo, Japan, (incorporated herein by reference) There is disclosed generation of "acid" water at the anode and "base" water at the cathode by electrolysis in which a membrane is interposed between the electrodes. The charged electrodes will cause the charged particles to migrate thereby increasing the normality of the cationic solution and anionic solution. The membrane eventually becomes saturated effectively ending the reaction.

I claim:

1. An energy cell that comprises:
   an inert anode;
   an anode compartment containing said anode;
   a cathode,
   a cathode compartment containing said cathode;
   an electrically conducting wall separating said anode compartment and said cathode compartment;
   a source of a solution of hydronium ions communicating through one conduit with said cathode compartment arranged to supply a solution of hydronium ions to said cathode compartment;
   a source of a solution of oxyanions communicating through another conduit with said anode compartment arranged to supply a solution of oxyanions to said anode compartment;
   said anode in said anode compartment and said cathode in said cathode compartment operably arranged in combination to provide a source of electrical energy to an impedance connected between said anode and cathode;
   a combustion chamber arranged to collect hydrogen from said cathode compartment and oxygen from said anode compartment for delivery to a combustion engine.

2. The energy cell of claim 1 wherein said source of hydronium ions and said source of oxyanions comprises an electrolysis cell having a source anode and a source cathode arranged to liberate hydronium ions from said source anode for delivery to said cathode chamber of said energy cell and arranged to liberate oxyanions from said source cathode for delivery to said anode chamber of said energy cell.

3. The energy cell of claim 1 wherein said cathode in said cathode compartment and said anode in said anode compartment each comprises a precious metal gauze.

4. The energy cell of claim 1 wherein said aqueous solution of hydronium ions contains about 19 moles per liter of hydronium ions.

5. The energy cell of claim 1 wherein said aqueous solution of oxyanions has a pH of about 13.7 and about 54 ppm of calcium and less than 500 ppm sulfate ion; and said solution of hydronium ions comprising a mole of one of calcium oxide, calcium hydrate and calcium hydride added to one molal solution of sulfuric acid, then passing said solution through a 10 micronfilter to remove precipitate.

6. The energy cell of claim 1 wherein said electrically conducting wall comprises one of a group of materials that consists of activated carbon, precious metal, nickel, stainless steel, and titanium.

* * * * *